Feb. 18, 1947. I. HILL Re. 22,842

METHOD AND MACHINE FOR MAKING COMPOSITE BOARDS

Original Filed Dec. 26, 1942

INVENTOR:
Irving Hill,
BY Arthur C. Dewey.
ATTORNEYS.

Reissued Feb. 18, 1947 Re. 22,842

UNITED STATES PATENT OFFICE 22,842

METHOD AND MACHINE FOR MAKING COMPOSITE BOARDS

Irving Hill, Lawrence, Kans., assignor, by mesne assignments, to George W. Swift, Jr., Inc., Bordentown, N. J., a corporation of New Jersey Original No. 2,384,676, dated September 11, 1945, Serial No. 470,292, December 26, 1942. Application for reissue August 5, 1946, Serial No. 688,399

6 Claims. (Cl. 154—31)

This invention relates to a composite board and method of manufacturing the same, and particularly a moisture resistant corrugated board. The moisture resistant nature and the use of such board for the manufacture of moisture resistant containers require use of a relatively slow adhesive, for example starch formaldehyde urea, in securing the lining sheets to the corrugated sheet.

While a high quality board is produced with the use of such slow setting adhesive, the slowly setting properties of the adhesive limit the speed at which the corrugated board may be manufactured, that is, the corrugator and liner applying rolls can not be operated any faster than the time required for the adhesive to take the set necessary in retaining the sheets in assembly. To illustrate, when starch formaldehyde urea adhesive is used, the maximum speed at which the corrugator can be operated is from 150 to 160 feet per minute, whereas the corrugator is adapted to operate at much higher speeds.

It is, therefore, a principal object of the present invention to provide a method by which higher operating speeds may be attained and which produces a high quality of moisture resistant board at a reduced cost.

A further object of the invention is to provide a method of bonding the sheets to form a composite unit by employing a fast setting adhesive in conjunction with the slow setting adhesive so that the fast setting adhesive holds the sheets in assembly during set of the slow setting adhesive.

In accomplishing these and other objects of the invention, as hereinafter pointed out, I have provided an improved method of manufacturing moisture resistant corrugated board as illustrated in the accompanying drawing, wherein.

Figure 1:
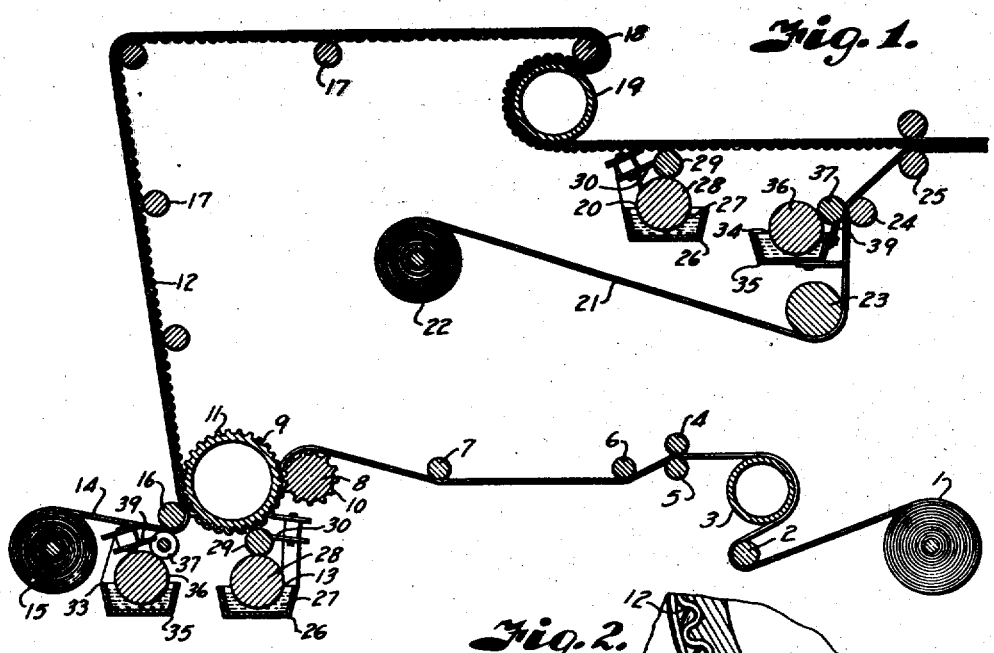
Fig. 1 is a diagrammatic section showing progress of sheets or webs through a machine for manufacturing corrugated board and illustrating the adhesive applicators arranged in accordance with the present invention.
Figure 2:
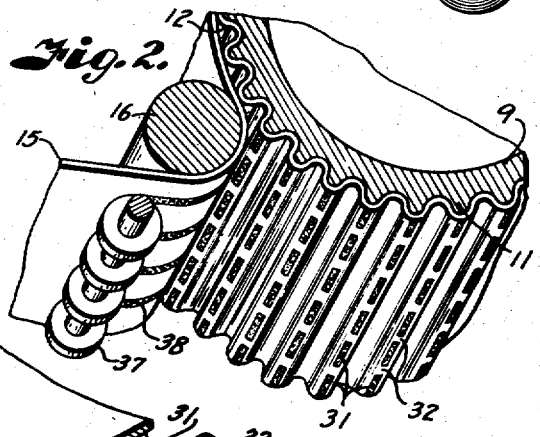
Fig. 2 is a fragmentary section through the main corrugating roll illustrating the slow setting adhesive after it has been applied to the tips of the corrugations of the corrugated sheet and showing application of the fast setting adhesive to the lining sheet and the lining sheet being applied to the corrugated sheet.
Figure 3:
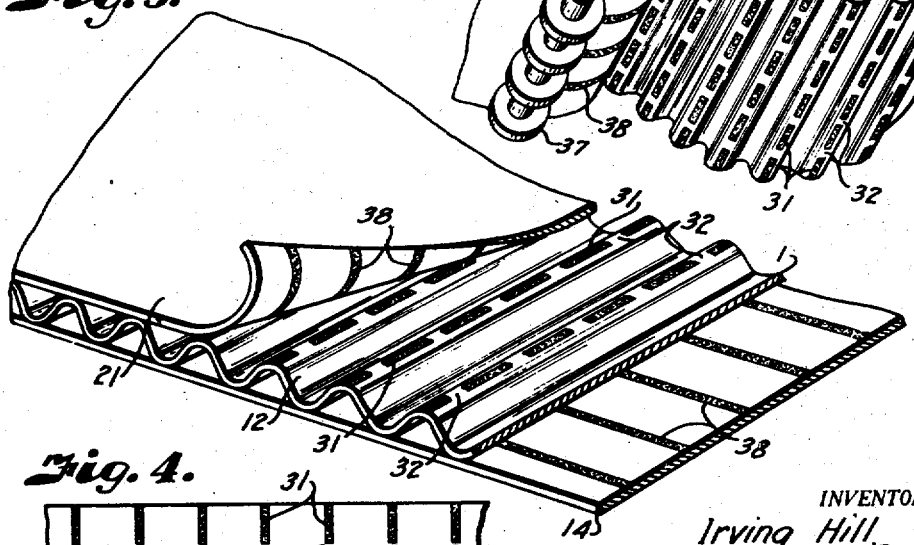
Fig. 3 is a fragmentary perspective view of a corrugated board produced in accordance with the present invention.
Figure 4:
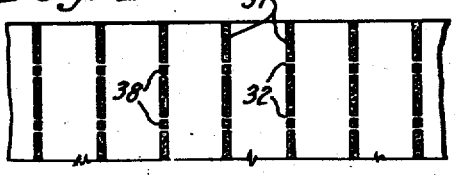
Fig. 4 is a diagrammatic view illustrating the relative relation of the effective portions of the fast and slow setting adhesives which bond the sheets together to form a composite unit.

Referring more in detail to the drawing:

In the manufacture of corrugated board the web from which the corrugated sheet is formed may be carried in a roll 1 that is drawn therefrom over a reversing roller 2, a heating roll 3 for conditioning the web preparatory to corrugation, between guide rollers 4 and 5 and under tensioning rollers 6 and 7 to the corrugating rolls 8 and 9. The corrugated rolls 8 and 9 have intermeshing ribs or teeth 10 and 11 to form corrugations 12 in the web as in conventional practice, the roller 10 being heated to facilitate formation of the corrugations.

Located in association with the corrugated roll 9 is an adhesive applicator mechanism 13 by which a moisture resistant adhesive is applied to the tips of the corrugations for bonding a lining sheet 14 to one side thereof. The lining sheet is also in the form of a web wound in a roll 15 and extends under a guide roller 16 that presses the lining sheet into bonding contact with the adhesive on the tips of the corrugations. The corrugated sheet and lining sheet are passed over a series of guide rollers 17, to a reversing roller 18 where the lining sheet is guided around a heating roll 19, which further conditions the sheets and assists in setting of the adhesive applied by the applicator mechanism 13.

Located below the heating roll is a second adhesive applicator mechanism 20 adapted for applying adhesive to the tips of the corrugations at the opposite side of the corrugated sheet preparatory to bonding of the liner sheet 21 to that side of the corrugated sheet. The lining sheet 21 is also in web form and is wound on a roll 22 and is guided by rollers 23, 24 and 25 into sealing contact with the adhesive applied by the applicator mechanism 20. The mechanism just described is substantially conventional equipment used in the manufacture of corrugated board. However, when moisture resistant board is being manufactured the apparatus must be operated at relatively slow speeds owing to the fact that the adhesive used in bonding this type of board is slow in taking a set sufficient to prevent disarrangement of the sheets.

This characteristic of the adhesive material restricts manufacturing capacity of the machine and I have therefore provided an improved method of bonding the sheets which method utilizes a fast setting adhesive such as the starch glue in conjunction with the slow setting adhesive such as starch formaldehyde urea, whereby an initial bond is quickly effected by the fast setting adhesive so that the machine may be operated at greatly increased speed, thereby increasing the output of the machine and reducing the cost of the board under production.

The above may be effected by applying one type of adhesive in spaced dots extending transversely and the other adhesive in the form of narrow lines or stripes extending longitudinally through the spaces between the transversely arranged dots.

In carrying out this feature of the invention, the applicator mechanisms 13 and 20 include a pan 26 for containing the slow setting adhesive as indicated at 27. Rotatable in the pans in contact with the body of adhesive are pickup rollers 28 that deposit adhesive in film upon applicator rollers 29, which rollers rotate in surface contact with the pickup rollers and in contact with the tips of corrugations as they are advanced incidental to rotation of the corrugator rolls. While various forms of applicator rollers may be used in applying the adhesive, for example a cylindrical roller, having scrapers 30 bearing thereon for removing portions of the adhesive from the applicator rollers so that the rollers apply the adhesive to the tips of the corrugations in the form of a series of sealing areas 31 spaced apart as indicated at 32, which space is adapted to be sealingly contacted with a fast setting adhesive applied to the adjacent face of the liner sheet 14 by applicator mechanisms 33 and 34, each including a pan 35 for containing supplies of fast setting adhesive. Rotatable in the pans are pickup rollers 36 for transferring the quick setting adhesive onto a plurality of laterally spaced applicator wheels 37 so spaced that the adhesive areas applied to the face sides of the liner sheets are in the form of longitudinal stripes 38 which register when the spaces 32 between the slow setting adhesive areas on the tips of the corrugations of the corrugated sheet. The width of the stripes 38 of quick setting adhesive is only sufficient to form the desired initial bond of the sheets so that the sheets are retained in bonded contact until the slow setting adhesive is effective. The applicator mechanisms 33 and 34 are preferably located so that the applicator wheels thereof contact the lining webs ahead of the guide rollers 16 and 25 respectively. In order that excessive adhesive may be removed from the side faces of the wheels they may be contacted by scrapers 39, thereby restricting the width of the stripes to the width of the wheels and avoid overlap of the two types of adhesive.

It is abvious that either the wheel type applicators or the roller and scraper type may be used as either one is effective in applying the adhesives in accordance with the present invention.

It is also obvious that adhesives may be applied in the form of spots instead of stripes as described without departing from the spirit of the invention.

From the foregoing it is obvious that stripes or spots of quick setting adhesive form adequate seals or bonds to retain the sheets in assembly during set of the slow setting adhesives. Therefore the corrugated board may be produced at a greater speed, for example in the instance of adhesives above noted the corrugating rolls may be increased to speeds of 250 to 260 feet per minute, allowing ample time for setting of the quick setting adhesive.

While I have shown and described the slow setting adhesive applied to the corrugated sheet in the form of a series of spaced sealing areas and fast setting adhesive applied in stripe form to the lining sheets, it is obvious that the adhesives may be reversed.

What I claim and desire to secure by Letters Patent is:

1. The method of bonding a lining sheet to a corrugated sheet in forming a corrugated board including, applying a slow setting adhesive to laterally spaced portions of the tips of said corrugations across the width of the corrugated sheet, applying similarly spaced stripes of fast setting adhesive along the length of the lining sheet, and bringing the sheets into contact with adhesive on one sheet contacting the spaces between the adhesive on the other sheet.

2. The method of bonding sheets in forming a corrugated board including, corrugating one of said sheets, applying spaced spots of adhesive on tips of said corrugation on the respective sides of the corrugated sheet, applying spaced stripes of a different adhesive to lining sheets, registering the stripes with said spaces on said tips of the corrugations, and bringing said sheets into sealing contact.

3. An apparatus for forming a moisture resistant corrugated board including, means for guiding a plurality of sheets into juxtaposed relation, means for corrugating an intermediate sheet, adhesive applicator rolls contacting tips of the corrugated sheet, means for scraping adhesive from the applicator rolls whereby the adhesive is applied by said rolls to the corrugations in spaced aligning spot-like areas, means for applying stripes of adhesive in spaced relation longitudinally of the other of said sheets, and means for bringing the sheets into sealing registry.

4. An apparatus for forming a moisture resistant corrugated board including, means for feeding a plurality of sheets through a fixed path, corrugating means located in the path of one of said sheets for corrugating said sheet, adhesive applicator means arranged on opposite sides of the corrugated sheet to contact the corrugations of the corrugated sheet for applying a slow setting adhesive to selected areas on the tips of said corrugations, and adhesive applicator means spaced from the first-mentioned applicator means and arranged to contact faces of the other sheets for applying a fast setting adhesive to differential areas on the faces of said other sheets, said feeding means being arranged to bring said other sheets into sealing contact with said corrugated sheet.

5. The method of bonding longitudinally traveling paper sheets, which includes successively producing transverse corrugations in one of said sheets, successively producing adhesive bearing areas on the tips of such corrugations, which areas on each corrugation are spaced transversely of the sheet with respect to each other, and such areas of successive corrugations being alined longitudinally of the sheet to provide spaces on said tips between such areas which spaces are alined longitudinally of the sheet, progressively producing longitudinally directed stripes of adhesive upon another sheet in register with respect to the aforesaid spaces, and progressively pressing the longitudinally traveling sheets into contact with each other and with the adhesive stripes on the second mentioned sheet contacting the longitudinally alined spaces between the adhesive bearing areas on the first mentioned corrugated sheet.

6. Apparatus for bonding longitudinally traveling paper sheets which includes corrugating roll means acting to produce transverse corrugations in one of said sheets, means for producing adhesive bearing areas on the tips of such corrugations, which areas of each corrugation are spaced transversely of the sheet with respect to each other, and such areas of successive corrugations being alined longitudinally of the sheet to provide spaces between such areas which spaces are alined longitudinally of the sheet, means for producing upon a lining sheet, longitudinally directed stripes of adhesive in register with the aforesaid spaces, and means for progressively pressing said lining sheet into contact with said tips of the corrugated sheet and with said adhesive stripes contacting said longitudinally alined spaces on said tips.

IRVING HILL.